(12) United States Patent
Chen (10) Patent No.: US 11,844,047 B2
(45) Date of Patent: *Dec. 12, 2023

(54) SYSTEM INFORMATION TRANSMISSION METHOD, TERMINAL AND NETWORK-SIDE EQUIPMENT

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,128

(22) Filed: Dec. 9, 2021

(65) Prior Publication Data

US 2022/0104172 A1 Mar. 31, 2022

Related U.S. Application Data

(63) Continuation of application No. 16/610,702, filed as application No. PCT/CN2018/085449 on May 3, 2018, now Pat. No. 11,234,209.

(30) Foreign Application Priority Data

May 4, 2017 (CN) .......................... 201710309727.1

(51) Int. Cl.
*H04W 68/00* (2009.01)
*H04W 74/08* (2009.01)
(Continued)

(52) U.S. Cl.
CPC ........... *H04W 68/005* (2013.01); *H04W 4/06* (2013.01); *H04W 72/23* (2023.01); *H04W 74/0833* (2013.01); *H04W 84/042* (2013.01)

(58) Field of Classification Search
CPC . H04W 68/005; H04W 4/06; H04W 72/1289; H04W 74/0833; H04W 84/042
See application file for complete search history.

(56) References Cited

U.S. PATENT DOCUMENTS 8,879,449 B2 * 11/2014 Sung ..................... H04W 48/12
370/324
11,234,209 B2 1/2022 Chen
(Continued)

FOREIGN PATENT DOCUMENTS

| CN | 101500282 A | 8/2009 |
| CN | 101778342 A | 7/2010 |

(Continued)

OTHER PUBLICATIONS

1st Chinese Office Action for Chinese Application No. 201710309727.1 dated Jun. 4, 2019 (dated Jun. 4, 2019)—11 pages (English translation—13 pages).

(Continued)

*Primary Examiner* — Dominic E Rego
(74) *Attorney, Agent, or Firm* — Culhane Meadows PLLC; Stephen J. Weeds (57) ABSTRACT

A method of transmitting system information, a terminal and a network-side equipment are provided. The method includes: receiving, by a terminal, an SI change notification transmitted by a first network-side equipment; and receiving, by the terminal, SI transmitted by the first network-side equipment and corresponding to the SI change notification. And the SI change notification is carried in a DCI format corresponding to a PDCCH used for scheduling the paging message, or a DCI format corresponding to a PDCCH scrambled with C-RNTI.

18 Claims, 5 Drawing Sheets

(51) Int. Cl.
*H04W 4/06* (2009.01)
*H04W 72/23* (2023.01)
*H04W 84/04* (2009.01)

(56) References Cited

U.S. PATENT DOCUMENTS

| | | | |
|---|---|---|---|
| 2010/0027466 A1 | 2/2010 | Mustapha et al. | |
| 2011/0075621 A1* | 3/2011 | Sung | H04W 48/12 370/329 |
| 2011/0103288 A1* | 5/2011 | Lee | H04W 4/90 370/312 |
| 2011/0194428 A1* | 8/2011 | Wang | H04W 72/005 370/312 |
| 2012/0052860 A1* | 3/2012 | Faronius | H04W 68/02 455/426.1 |
| 2014/0269566 A1* | 9/2014 | Wang | H04W 68/005 370/329 |
| 2014/0341059 A1* | 11/2014 | Jang | H04W 48/06 370/252 |
| 2015/0099501 A1* | 4/2015 | Kim | H04W 72/0453 455/418 |
| 2015/0327224 A1* | 11/2015 | Guan | H04L 45/02 370/329 |
| 2016/0219495 A1 | 7/2016 | Martin et al. | |
| 2017/0251500 A1 | 8/2017 | Agiwal et al. | |
| 2017/0303247 A1* | 10/2017 | Yasukawa | H04L 5/0053 |
| 2018/0035359 A1 | 2/2018 | Ishii et al. | |
| 2018/0035468 A1 | 2/2018 | Ishii et al. | |
| 2018/0063815 A1 | 3/2018 | Ishii et al. | |
| 2018/0103369 A1 | 4/2018 | Chou et al. | |
| 2018/0132168 A1 | 5/2018 | Ingale et al. | |
| 2018/0167918 A1 | 6/2018 | Ishii | |
| 2018/0199163 A1* | 7/2018 | Chen | H04W 48/14 |
| 2018/0279378 A1 | 9/2018 | Tsai et al. | |
| 2019/0132749 A1 | 5/2019 | Wei et al. | |
| 2019/0150079 A1 | 5/2019 | Chen et al. | |
| 2019/0223094 A1 | 7/2019 | Ingale et al. | |
| 2019/0306853 A1 | 10/2019 | Ishii et al. | |
| 2019/0349841 A1 | 11/2019 | Ishii et al. | |
| 2019/0349844 A1 | 11/2019 | Ishii et al. | |
| 2020/0084700 A1 | 3/2020 | Wei et al. | |
| 2020/0162999 A1 | 5/2020 | Lee et al. | |
| 2020/0163050 A1 | 5/2020 | Lee et al. | |
| 2020/0314898 A1 | 10/2020 | Sun et al. | |
| 2020/0344674 A1 | 10/2020 | Ishii | |
| 2020/0396605 A1 | 12/2020 | Torvinen et al. | |
| 2020/0413307 A1 | 12/2020 | Mrozinski | |

FOREIGN PATENT DOCUMENTS

| | | |
|---|---|---|
| CN | 101873669 A | 10/2010 |
| CN | 101877825 A | 11/2010 |
| CN | 102118741 A | 7/2011 |
| CN | 102223690 A | 10/2011 |
| CN | 103428855 A | 12/2013 |
| CN | 104219767 A | 12/2014 |
| CN | 106559776 A | 4/2017 |
| WO | 2016195617 A1 | 12/2016 |

OTHER PUBLICATIONS

1st Non-Final Office Action for U.S. Appl. No. 16/610,702, dated Mar. 16, 2021 (dated Mar. 16, 2021)—29 pages.
Chinese Search Report for Chinese Application No. 201710309727.1, dated Apr. 25, 2019 (dated Apr. 25, 2019)—5 pages (English translation—3 pages).
Extended European Search Report for European Application No. 18793932.7, dated Mar. 13, 2020 (dated Mar. 13, 2020)—9 pages.
International Search Report and Written Opinion for International Application No. PCT/CN2018/085449, dated Nov. 14, 2019 (dated Mar. 14, 2019)—10 pages (English translation—7 pages).
MediaTek Inc.: "NR SI Update" R2-1702785, 3GPP TSG-RAN2 #97Bis Meeting, Spokane, WA, US, Apr. 3, 2017, 7 pages.
MediaTek Inc.: "Stored System Information for OSI," R2-1700269, 3GPP TSG-RAN2 NR Ad Hoc Meeting, Spokane, Washington, US, Jan. 17, 2017, 5 pages.
Samsung: "System Information Signalling Design in NR," R2-163371, 3GPP TSG-RAN WG2 Meeting #94, Nanjing, China, May 23, 2016, 7 pages.

* cited by examiner

SYSTEM INFORMATION TRANSMISSION METHOD, TERMINAL AND NETWORK-SIDE EQUIPMENT

CROSS-REFERENCE TO RELATED APPLICATION

The present application claims the benefit of and is a continuation application of U.S. patent application Ser. No. 16/610,702 filed on Nov. 14, 2019 which is the U.S. national phase of PCT Application PCT/CN2018/085449 filed on May 3, 2018, which claims priority to Chinese patent application No. 201710309727.1 filed on May 4, 2017, which are incorporated herein by reference in their entirety.

TECHNICAL FIELD

This disclosure relates to wireless communication technologies, in particular to a method of transmitting system information, a terminal and a network-side equipment.

BACKGROUND

In $5^{th}$ Generation (5G) mobile communication system, in order to reduce signaling overhead, improve radio resource utilization and lower base station energy consumption, New Radio (NR) proposes to divide system information (SI) into two categories: minimum SI and other SI. The other SI is also called On-demand SI and encompasses all SI except for the minimum SI. The minimum SI is broadcast by a base station to a terminal, while the On-demand SI is requested by the terminal from the base station on demand.

In conventional communication systems prior to 5G, should any change occurs to SI, a base station broadcasts or unicasts the changed SI to a terminal. However, as the On-demand SI in 5G is requested on demand voluntarily, system resources will be wasted if the conventional mode of transmitting SI to a terminal immediately after a change occurs to the SI is adopted.

SUMMARY

In order to resolve the problem of resource waste, embodiments of this disclosure provide a method of transmitting system information, a terminal and a network-side equipment.

A first aspect of embodiments of this disclosure provides a method of transmitting system information. The method includes: receiving, by a terminal, an SI change notification transmitted by a first network-side equipment; and receiving, by the terminal, SI transmitted by the first network-side equipment and corresponding to the SI change notification.

A second aspect of embodiments of this disclosure provides a method of transmitting system information. The method includes: transmitting, by a network-side equipment, an SI change notification to a terminal; and transmitting, by the network-side equipment, SI corresponding to the SI change notification to the terminal.

A third aspect of embodiments of this disclosure provides a terminal. The terminal includes: a reception module, configured to receive a system information (SI) change notification transmitted by a first network-side equipment, and receive SI transmitted by the first network-side equipment and corresponding to the SI change notification.

A fourth aspect of embodiments of this disclosure provides a network-side equipment. The network-side equipment includes: a transmission module, configured to transmit an SI change notification to a terminal; and transmit SI corresponding to the SI change notification to the terminal.

A fifth aspect of embodiments of this disclosure provides a terminal. The terminal includes a processor and a memory, where the memory is configured to store program, and the processor is configured to call program stored in the memory to implement the method provided in the first aspect of embodiments of this disclosure.

A sixth aspect of embodiments of this disclosure provides a network-side equipment. The network-side equipment includes a processor and a memory, where the memory is configured to store program, and the processor is configured to call program stored in the memory to implement the method provided in the second aspect of embodiments of this disclosure.

A seventh aspect of embodiments of this disclosure provides a terminal. The terminal includes at least one processing element (or chip) configured to implement the method of the foregoing first aspect.

An eighth aspect of embodiments of this disclosure provides a network-side equipment. The network-side equipment includes at least one processing element (or chip) configured to implement the method of the foregoing second aspect.

A ninth aspect of embodiments of this disclosure provides a program. The program is configured to be executed by a processor to implement the method of the foregoing first aspect.

A tenth aspect of embodiments of this disclosure provides a program product, e.g., a computer readable storage medium, which including the program of the ninth aspect.

An eleventh aspect of embodiments of this disclosure provides a program. The program is configured to be executed by a processor to implement the method of the foregoing second aspect.

A twelfth aspect of embodiments of this disclosure provides a program product, e.g., a computer readable storage medium, which including the program of the eleventh aspect.

A thirteenth aspect of embodiments of this disclosure provides a computer readable storage medium including instructions, the instructions are configured to be executed by a computer to implement the method of transmitting system information as described in the first aspect.

A fourteenth aspect of embodiments of this disclosure provides a computer readable storage medium including instructions, the instructions are configured to be executed by a computer to implement the method of transmitting system information as described in the second aspect.

According to the method of transmitting system information, the terminal and the network-side equipment provided by embodiments of this disclosure, the terminal receives an SI change notification transmitted by a first network-side equipment; and then receives SI transmitted by the first network-side equipment and corresponding to the SI change notification. As such, receiving, by the terminal, SI transmitted by the first network-side equipment and corresponding to the SI change notification after the SI change notification is received by the terminal is achieved, thereby improving the system resource utilization. In addition, the network-side equipment transmits SI corresponding to the SI change notification after the SI change notification is transmitted, which facilitates improving the system resource utilization.

DETAILED DESCRIPTION

The exemplary embodiments are detailed in the following description, and examples of the embodiments are shown in the accompanying drawings, same reference numerals designate same or like elements throughout the several drawings, unless defined otherwise. The implementations described in the following exemplary embodiments by no means represent all implementations in consistent with the embodiments of this disclosure, rather they are merely examples of the device and method in consistent with some aspects of the embodiments of this disclosure which are specified in the claims.

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence except those shown or described here. In addition, terms "include" and "have" and any transformation thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

Figure 1:
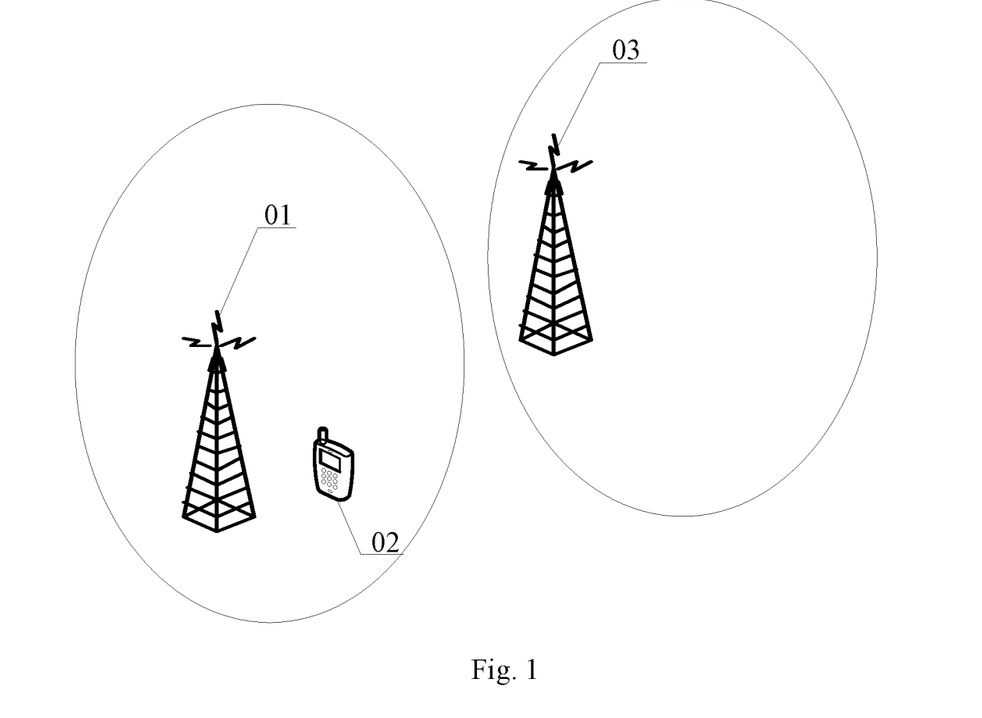
FIG. 1 is a schematic diagram of a system architecture provided by embodiments of this disclosure.

FIG. 1 is a schematic diagram of a system architecture provided by embodiments of this disclosure. As shown in FIG. 1, the system includes: a first network-side equipment 01, a second network-side equipment 03 and a terminal 02. The terminal 02 may be handed over to a different network-side equipment as needed. In FIG. 1, the first network-side equipment 01 and the second network-side equipment 03, which have different coverages, are shown for example, e.g., the terminal 02 may have access to the first network-side equipment 01, and may also be handed over from the first network-side equipment 01 to the second network-side equipment 03 as needed.

The first network-side equipment 01 and the second network-side equipment 03 may be a Global System of Mobile communication (GSM) or Code Division Multiple Access (CDMA) Base Transceiver Station (BTS), or a Wideband Code Division Multiple Access (WCDMA) NodeB (NB), or a LTE Evolutional Node B (eNB or eNodeB), or a relay station or an access point, or a future 5G network base station, etc., which is not limited herein.

The terminal 02 may be wireless or wired. A wireless terminal may refer to a device used to provide user with data connectivity for voice and/or other services, a hand-held device with wireless connection function enabled, or other processing device connected to a wireless modem. The wireless terminal may communicate with one or more core networks via a Radio Access Network (RAN). The wireless terminal may be a mobile terminal, such as a mobile telephone (or referred to as a "cellular" phone) or a computer with a mobile terminal, such as a portable, pocket-sized, hand-held, computer built-in, or in-vehicle mobile apparatus, which exchanges voice and/or data with the wireless access network. For example, the wireless terminal may be a device such as a personal communication service (PCS, Personal Communication Service) telephone, a cordless telephone set, a Session Initiation Protocol (SIP) telephone, a Wireless Local Loop (WLL) station, or a Personal Digital Assistant (PDA). The wireless terminal may also be referred to as a system, a subscriber unit, a subscriber station, a mobile station, a mobile, a remote station, a remote terminal, an access terminal, a user terminal, a user agent, or a user device or user equipment, which is not limited herein.

According to embodiments of this disclosure, with respect to the situation in which SI is to be changed, a new transmission method is introduced.

Figure 2:
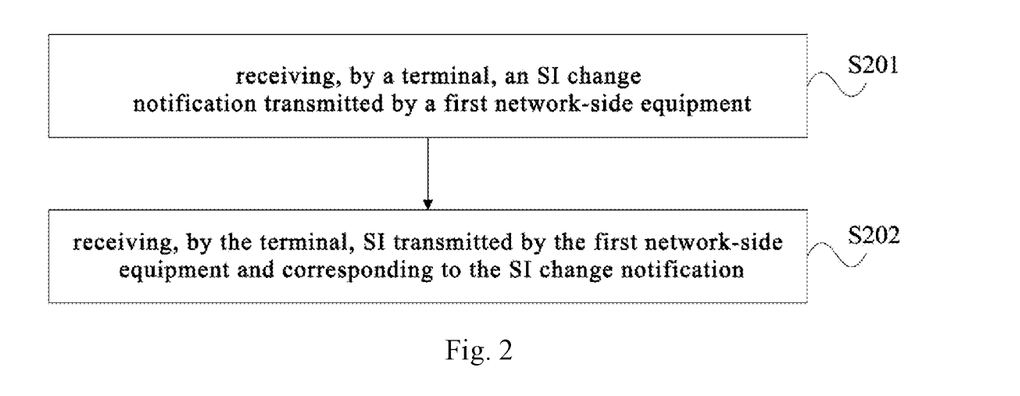
FIG. 2 is a schematic flow diagram of a method of transmitting system information provided by an embodiment of this disclosure.

FIG. 2 is a schematic flow diagram of a method of transmitting system information provided by an embodiment of this disclosure. As shown in FIG. 2, the method includes the following steps.

S201, receiving, by a terminal, an SI change notification transmitted by a first network-side equipment.

The terminal is currently accessing the first network-side equipment.

In case that a change occurs to SI, the first network-side equipment transmits an SI change notification to the terminal. The SI change notification is configured to indicate that SI is changed.

In some optional embodiments, the SI may be system information on demand of the terminal. For example, the SI may refer to On-demand SI, and changes to the SI may be changes to part or all of parameters of the On-demand SI.

In some optional embodiments, the SI change notification may indicate that one or more system information blocks (SIB) of the SI are changed, one SI is changed, or one group of SI are changed, which is not limited herein.

S202, receiving, by the terminal, SI transmitted by the first network-side equipment and corresponding to the SI change notification.

In embodiments of this disclosure, the terminal may receive SI transmitted by the first network-side equipment and corresponding to the SI change notification according to its own demand.

In some optional embodiments, after the first network-side equipment transmits the SI change notification, the first network-side equipment may broadcast or unicast to the terminal SI corresponding to the SI change notification, or transmit SI corresponding to the SI change notification on demand of the terminal.

Accordingly, the terminal may receive voluntarily SI transmitted by the first network-side equipment and corresponding to the SI change notification, for example, request voluntarily or receive voluntarily SI transmitted by the first network-side equipment and corresponding to the SI change notification, which is not limited herein.

In this embodiment, the terminal receives an SI change notification transmitted by the first network-side equipment; and then receives SI transmitted by the first network-side equipment and corresponding to the SI change notification. As such, receiving, by the terminal, SI transmitted by the first network-side equipment and corresponding to the SI change notification after the SI change notification is received by the terminal is achieved, thereby further improving the resource utilization. In addition, the network-side equipment transmits SI corresponding to the SI change notification after the SI change notification is transmitted, which facilitates improving the resource utilization.

In a possible implementation, prior to receiving, by the terminal, SI corresponding to the SI change notification, the terminal may receive version information (e.g., ValueTag) of the SI transmitted by the first network-side equipment, and determine, in accordance with the version information of the SI, to receive the SI.

It is noted, the version information of SI may be version information of the SI corresponding to the SI change notification, i.e., version information of the changed SI.

If the terminal has version information stored therein, the terminal compares the stored version information with the version information of the SI corresponding to the SI change notification to determine whether they are the same. If they are the same, the terminal no longer receives the SI corresponding to the SI change notification. If they are not the same, the terminal determines to receive the SI corresponding to the SI change notification.

In specific, determining, by the terminal in accordance with the version information of SI, to receive the SI may include: determining, by the terminal, whether version information stored in the terminal is the same with the version information of SI; and when version information stored in the terminal is not the same with the version information of SI, the terminal determines to receive the SI.

The version information may be ValueTag. Part of SIBs in the SI is associated with ValueTag. When ValueTag remains unchanged, it means the SIBs associated with ValueTag are unchanged; and when ValueTag is changed, it means all SIBs associated with ValueTag are changed, and thus it is necessary to acquire an updated SI. Taking ValueTag in conventional standards for example, ValueTag is carried in SIB1. If ValueTag in SIB1 is different from ValueTag stored by the terminal, it indicates that all stored SI, except for SIB10, SIB11 and SIB12, is invalid.

In some optional embodiments, the version information may be carried directly in the SI change notification. After the terminal receives the SI change notification, the terminal compares version information of SI with version information stored by the terminal. Of course, the version information may be carried in other message, which is not limited by this embodiment.

As far as a terminal newly accessing the network-side equipment is concerned, since the terminal has no SI stored, it may be determined to receive SI.

On the basis of the foregoing embodiment, the terminal may receive indication message transmitted by a second network-side equipment. The indication message is configured to indicate change to SI. The terminal may determine according to the indication message whether to receive SI transmitted by the second network-side equipment.

This solution is applicable to a scenario in which the terminal is handed over from the first network-side equipment to the second network-side equipment. If SI of the second network-side equipment is changed, and the second network-side equipment has already transmitted an SI change notification before the terminal accesses the second network-side equipment, the second network-side equipment may transmit an indication message to the terminal to notify the terminal of the change to SI. The terminal determines according to the indication message whether to receive SI transmitted by the second network-side equipment.

In some optional embodiments, the indication message may indicate changed SI. If the terminal has already received from the first network-side equipment SI indicated by the indication message, the terminal may refrain from receiving SI transmitted by the second network-side equipment.

In addition, the indication message may carry version information of SI, such that the terminal may determine whether to receive SI according to stored version information and version information in the indication message.

In some optional embodiments, the indication message may be downlink control information (DCI). DCI may be the DCI corresponding to a physical downlink control channel (PDCCH), which contains indication bits configured to indicate change to SI. For example, a certain indication bit in conventional DCI is utilized to indicate whether a change occurs to SI, or one bit dedicated to identifying whether SI is changed may be added. Alternatively, multiple bits may be employed to specifically identify the changed SIBs, which is not limited herein.

Accordingly, the terminal may determine to receive SI when the DCI indicates that SI is changed, and determine not to receive SI when the DCI indicates that SI remains unchanged. The terminal may also determine whether to receive SI in accordance with changed SI or SIB indicated by the DCI.

In some optional embodiments, after the first network-side equipment transmits the SI change notification, the first network-side equipment may broadcast SI corresponding to the SI change notification. For example, the first network-side equipment may broadcast SI corresponding to the SI change notification in a next period following a current change period or when a preset number of change periods after the current change period elapses. Under the circumstance, the terminal receives a scheduling indication message transmitted by the first network-side equipment before receiving SI transmitted by the first network-side equipment and corresponding to the SI change notification. The scheduling indication message is configured to indicate that the first network-side equipment is broadcasting SI corresponding to the SI change notification. More specifically, the scheduling indication message is further configured to indicate the SI being broadcast by the first network-side equipment, i.e., which SI is being broadcast.

In some optional embodiments, the terminal may determine whether to receive the SI according to the scheduling indication message. The terminal determines, according to the scheduling indication message, whether the SI being broadcast by the first network-side equipment includes SI corresponding to the SI change notification. If the SI being broadcast by the first network-side equipment includes SI corresponding to the SI change notification, the terminal determines to receive the SI being broadcast by the first network-side equipment; otherwise, the terminal determines not to receive the SI being broadcast by the first network-side equipment Accordingly, that the terminal receives SI transmitted by the first network-side equipment and corresponding to the SI change notification may include receiving, by the terminal, SI broadcast by the first network-side equipment and corresponding to the SI change notification within a preset period.

In some optional embodiments, the preset period may be a certain change period after a current period, e.g., a subsequent change period spaced apart from the current change period by the number n of periods. The n is an integer greater than or equal to zero. When n is zero, the preset period is the next change period following the current change period. The n may be preset in the terminal, or may be informed by the first network-side equipment through a special message to the terminal, which is not limited herein.

The preset period may be a specific change period. A change period may be divided into one or more consecutive time windows. The first network-side equipment broadcasts SI corresponding to the SI change notification in a change period, and the terminal receives the SI sequentially in the time windows. However, in related art, the terminal is unaware of which time window is the last time window, in another word, the terminal may continue waiting for SI after having completed the reception of SI corresponding to the SI change notification in the last time window, thereby impacting negatively the subsequent operation of the terminal and worsening the power consumption of the terminal.

In this embodiment, broadcast indication information may be carried in the SI corresponding to the SI change notification to indicate whether there is SI to be received in the next time window.

In some optional embodiments, that the terminal receives SI transmitted by the first network-side equipment and corresponding to the SI change notification within the preset period may include: starting receiving, by the terminal, the SI broadcast by the first network-side equipment and corresponding to the SI change notification in a start time window of the preset period. The terminal determines, in accordance with the broadcast indication information, whether to continue receiving SI in a next time window following a current time window.

The broadcast indication information may be carried in SI transmitted in a last time window of the preset period, and the broadcast indication information indicates that the current time window is the last time window of the preset period or there is no SI to be transmitted in the next time window. Alternatively, the broadcast indication information may be carried in SI transmitted in each time window to indicate specifically whether there is SI to be transmitted in a next time window.

In this embodiment, after the terminal completes the reception of SI in the last time window, the terminal may stop waiting for SI and prepare for subsequent operation, that is, the terminal may proceed to the subsequent operation rapidly, thereby improving the operation efficiency of the terminal.

Further, the terminal may transmit a second SI request to the first network-side equipment as needed, to request SI from the first network-side equipment. If there is the second SI request being transmitted or to be transmitted by the terminal to the first network-side equipment, then following the receiving, by the terminal, the SI change notification transmitted by the first network-side equipment, the terminal stops transmitting the second SI request, or the terminal forbids transmitting the second SI request for a preset time duration. In another word, the terminal was supposed to request SI from the first network-side equipment, however the terminal is notified by the SI change notification that SI is changed, as a result, the terminal refrains from transmitting the second SI request for the time being.

In some optional embodiments, the terminal may further refrain from transmitting the second SI request for a preset time duration according to a specific situation. The preset time duration may be determined by the terminal, may be set in advance, or may be instructed by the network-side equipment, which is not limited herein.

It is noted, the scenario that there is the second SI request to be transmitted to the first network-side equipment may include: in the case that the terminal transmits request messages consecutively, the terminal need to receive a response fed back from the first network-side equipment before transmitting a further request message. In this embodiment, the terminal waits for the response from the first network-side equipment while the preparation for the transmission of the second SI request is completed.

On the basis of the foregoing embodiment, prior to receiving, by the terminal, the SI transmitted by the first network-side equipment and corresponding to the SI change notification, the terminal transmits a first SI request to the first network-side equipment. The first SI request is configured to request SI corresponding to the SI change notification. That is, having receiving the change notification, the terminal may request voluntarily SI corresponding to the SI change notification.

In practice, the terminal may determine whether to transmit the first SI request after the change notification is received. In some optional embodiments, the terminal may determine, in accordance with its own demand and/or version information of SI, to transmit the first SI request.

For example, the terminal receives version information of SI transmitted by the first network-side equipment and corresponding to the SI change notification, and determines to transmit the first SI request. For example, the terminal compares the version information with version information stored in itself, and if the version information is the same, there is no need to receive the SI and as a result there is no need to transmit the first SI request. When the version information stored in the terminal is different from the version information of SI, the terminal determines to transmit the first SI request.

It is also possible that the terminal receives a scheduling indication message transmitted by the first network-side equipment. The scheduling indication message is configured to indicate the SI being broadcast by the first network-side equipment, i.e., which SI is being broadcast. If the terminal determines that the SI being broadcast by the first network-side equipment which is indicated by the scheduling indication message doesn't include the SI corresponding to the first SI request, the terminal determines to transmit the first SI request. If the SI being broadcast by the first network-side equipment which is indicated by the scheduling indication message includes the SI corresponding to the first SI request, the terminal may directly receive the SI in the preset period, without having to transmit the first SI request.

The terminal may determine to transmit the first SI request according to its own demand, that is, the terminal determines to transmit the first SI request according to the function to be performed subsequently, for example, if the terminal is to perform a cell reselection function subsequently, then it is necessary to transmit the first SI request, to obtain SI corresponding to the cell reselection function. Of course, the first SI request may be transmitted according to other demands, which is not limited herein.

In some optional embodiments, if the terminal determines to transmit the first SI request, the terminal may further determine a transmission time of the first SI request, such that the terminal transmits the first SI request to the first network-side equipment at the transmission time.

The terminal may transmit the first SI request as soon as the change notification is received. This mode is applicable to a terminal having SI stored therein, however, the disclosure is not limited thereto, and a terminal newly accessing the network-side equipment may as well transmit the first SI request as soon as the change notification is received.

Optionally, the terminal may withhold the transmission of the first SI request after the change notification is received. In specific, the terminal may determine the transmission time of the first SI request according to its own demand, for example, the terminal determine the transmission time of the first SI request according to SI required by function to be performed subsequently. For example, the terminal may determine the transmission time of the first SI request, according to a broadcast function to be performed imminently, to acquire SI corresponding to the broadcast function.

It is noted, in embodiments of this disclosure, the scheduling indication message may be included in minimum SI transmitted by the first network-side equipment, however, the disclosure is not limited thereto.

In an optional implementation, the first SI request may be transmitted by the terminal to the first network-side equipment during a random access process if the terminal is in an idle or inactive state.

It is noted, when the terminal initiates a random access process, a random access request (MSG1) is firstly transmitted to the first network-side equipment, and when a random access response fed back by the first network-side equipment is received by the terminal, then a random access configuration request (MSG3) is transmitted to the first network-side equipment. Thus the first SI request may be MSG1 or MSG3. That is, when the random access request or random access configuration request is utilized to request SI corresponding to the SI change notification, request for SI corresponding to the SI change notification may be carried in the random access request or random access configuration request, which is not limited herein.

In addition, since a terminal has to transmit data in connected state, for a terminal with inadequate reception capability, the reception of the SI corresponding to the SI change notification may initiated after the terminal is switched from the connected state to the idle or inactive state. That is, the terminal is switched from the connected state to the idle or inactive state prior to receiving the SI transmitted by the first network-side equipment and corresponding to the SI change notification.

In some optional embodiment, after the first network-side equipment receives the first SI request transmitted by the terminal, the first network-side equipment may unicast or broadcast the SI corresponding to the SI change notification to the terminal.

If the first network-side equipment unicasts the SI corresponding to the SI change notification to the terminal, the terminal may be scheduled first, then the SI corresponding to the SI change notification is transmitted to the terminal individually. The first network-side equipment may transmit scheduling information to the terminal, which is configured to indicate a resource location of the SI transmitted by the network-side equipment and corresponding to the SI change notification. The terminal receives, in accordance with the resource location indicated by the scheduling information, the SI transmitted by the first network-side equipment and corresponding to the SI change notification.

For example, the scheduling information indicates a time-frequency resource occupied by the SI transmitted by the network-side equipment and corresponding to the SI change notification, and the like. Accordingly, the terminal may receive SI at the time-frequency resource indicated by the scheduling information.

In some optional embodiments, new contents are proposed for the SI-related change notification, version information and the like.

The change notification may be carried in any one of: minimum SI, a paging message, a downlink control information (DCI) format corresponding to a physical downlink control channel (PDCCH) used for scheduling the paging message, or a DCI format corresponding to a PDCCH scrambled with cell radio network temporary identifier (C-RNTI).

The minimum SI may be transmitted voluntarily by the first network-side equipment to the terminal without the request of the terminal. The DCI of different PDCCHs is different, that is, the DCI corresponding to the PDCCH used for scheduling the paging message is different from the DCI corresponding to the PDCCH scrambled with C-RNTI.

One or more bits in the change notification may be used to identify whether SI is changed. Take one bit for example, a bit value of "1" denotes there is change, while "0" denotes there is no change.

In specific, the change notification may further include: a set of SI change identifiers (ID) which is configured to identify whether there is a change to corresponding SI.

The set of SI change identifiers may have different granularities. For example, the set of SI change identifiers includes a per-SI block (SIB) change ID. That is, there is one identifier bit in the change notification for each SIB of the SI to identify whether the SIB is changed.

Alternatively, the set of SI change identifiers includes a per-SI change ID. That is, each SI corresponds to one identifier bit to identify whether there is a change.

Alternatively, the set of SI change identifiers includes a per-SIB group change ID. Each SIB group includes one or more preset SI.

Alternatively, the set of SI change identifiers includes a per-functionality change ID. Each functionality includes one or more SI corresponding to a same function. That is, SI may be divided into different functionalities, e.g., the SI corresponding to cell reselection may be divided into a same functionality.

In some optional embodiments, the change notification may further include one or more of: an SI ID, an SI area ID, or version information.

The SI ID corresponds to the set of SI change identifiers. In specific, when the set of SI change IDs includes the per-SIB change ID, the SI ID includes a per-SIB ID. Of course, SIB may be identified with a fixed bit, e.g., the first bit of the change notification is the change identifier bit for SIB1. In this way, no dedicated SI ID is required.

Alternatively, when the set of SI change IDs includes the per-SI change ID, the SI ID includes a per-SI ID. Similar to the scenario with SIB, SI may also be identified with a fixed bit.

Alternatively, when the set of SI change IDs includes the per-SIB group change ID, the SI ID includes a per-SIB group ID. Similar to the scenario with SIB, SIB group may also be identified with a fixed bit.

Alternatively, when the set of SI change IDs includes the per-functionality change ID, the SI ID includes a per-functionality ID. Similar to the scenario with SIB, functionality may also be identified with a fixed bit.

The SI area ID is any one of: a cell ID, a cell group ID, a transmission reception point (TRP) ID or a TRP group ID.

In some optional embodiments, the version information may include one or more of: an SI ValueTag, an SI ID, or an SI area ID.

An SI ValueTag with N bits may be provided, and N is an integer greater than zero.

The SI ID includes any one of: the per-SIB ID, the per-SI ID, the per-SIB group ID, or the per-functionality ID, which is similar to the foregoing embodiment, thus a repeated description thereof is omitted herein.

The SI area ID is any one of: a cell ID, a cell group ID, a TRP ID or a TRP group ID, which is similar to the foregoing embodiment, thus a repeated description thereof is omitted herein.

Figure 3:
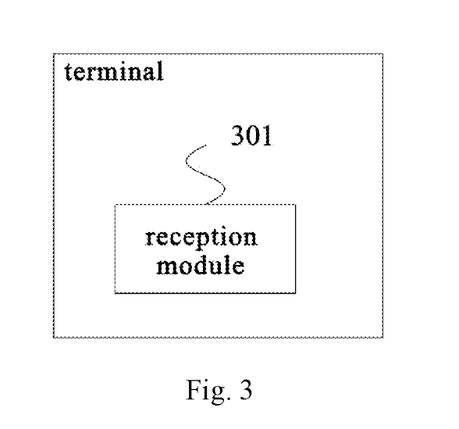
FIG. 3 is a schematic structural diagram of a terminal provided by an embodiment of this disclosure.

FIG. 3 is a schematic structural diagram of a terminal provided by an embodiment of this disclosure. As shown in FIG. 3, the terminal includes a reception module 301.

The reception module 301 is configured to receive an SI change notification transmitted by the first network-side equipment, and receive SI transmitted by the first network-side equipment and corresponding to the SI change notification.

In this embodiment, the terminal receives an SI change notification transmitted by the first network-side equipment; and then receives SI transmitted by the first network-side equipment and corresponding to the SI change notification. As such, receiving, by the terminal, SI transmitted by the first network-side equipment and corresponding to the SI change notification after the SI change notification is received by the terminal is achieved, thereby further improving the resource utilization. In addition, the network-side equipment transmits SI corresponding to the SI change notification after the SI change notification is transmitted, which also facilitates improving the resource utilization.

Figure 4:
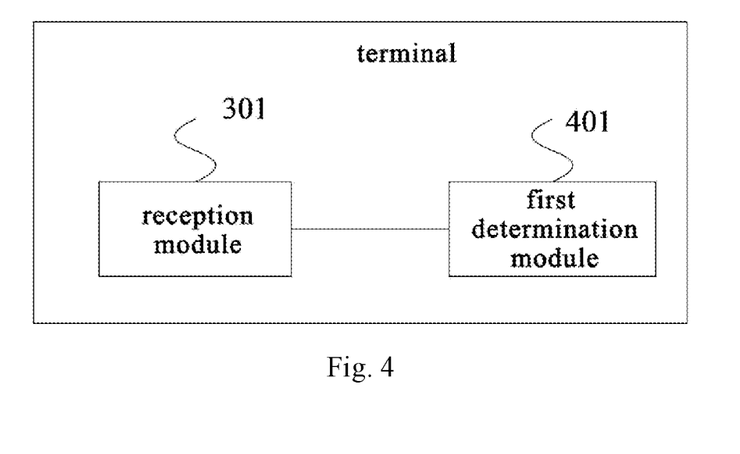
FIG. 4 is another schematic structural diagram of a terminal provided by an embodiment of this disclosure.

FIG. 4 is a schematic structural diagram of a terminal provided by another embodiment of this disclosure. As shown in FIG. 4, on the basis of FIG. 3, the terminal may further include a first determination module 401.

In some optional embodiments, the reception module 301 is further configured to receive version information of the SI transmitted by the first network-side equipment.

The first determination module 401 is configured to determine, in accordance with the version information of the SI, to receive the SI.

The first determination module 401 may be specifically configured to determine whether version information stored in the terminal is the same with the version information of the SI, and determine to receive the SI when the version information stored in the terminal is not the same with the version information of the SI. The version information of the SI is carried in the SI change notification.

Figure 5:
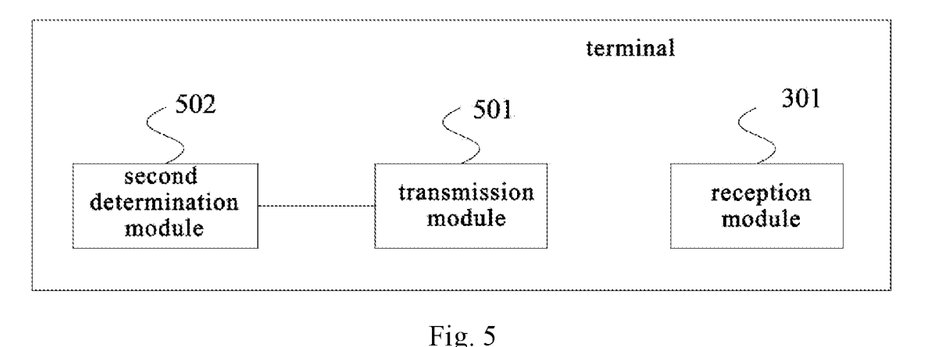
FIG. 5 is yet another schematic structural diagram of a terminal provided by an embodiment of this disclosure.

FIG. 5 is a schematic structural diagram of a terminal provided by another embodiment of this disclosure. As shown in FIG. 5, on the basis of FIG. 3, the terminal may further include a transmission module 501. The transmission module 501 is configured to transmit a first SI request to the first network-side equipment before the reception module 301 receives the SI transmitted by the first network-side equipment and corresponding to the SI change notification.

Referring to FIG. 5, the terminal may further include a second determination module 502, which is configured to determine, in accordance with a demand of the terminal and/or version information of the SI, to transmit the first SI request before the transmission module 501 transmits the first SI request to the first network-side equipment.

In some optional embodiments, the second determination module 502 is specifically configured to determine whether version information stored in the terminal is the same with the version information of the SI, and determine to transmit the first SI request when the version information stored in the terminal is not the same with the version information of the SI.

Figure 6:
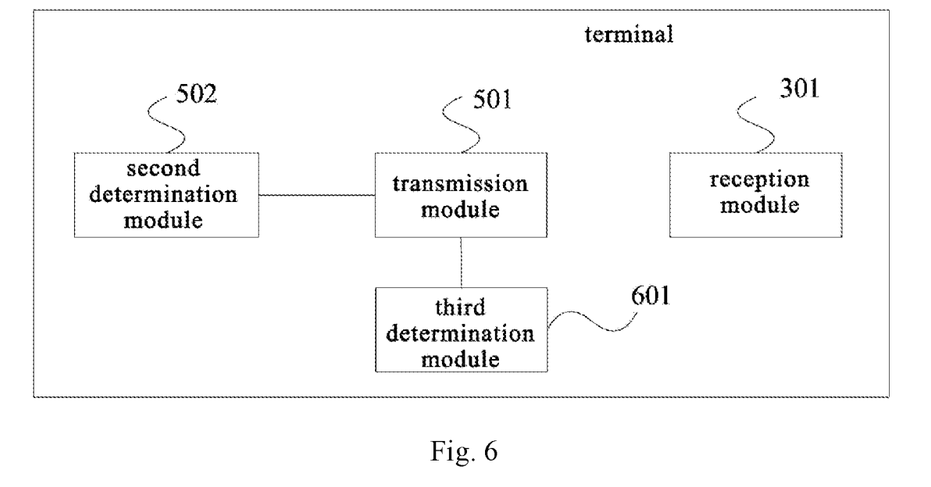
FIG. 6 is still yet another schematic structural diagram of a terminal provided by an embodiment of this disclosure.

FIG. 6 is a schematic structural diagram of a terminal provided by another embodiment of this disclosure. As shown in FIG. 6, on the basis of FIG. 5, the terminal may further include a third determination module 601. The third determination module 601 is configured to determine a transmission time of the first SI request before the transmission module 501 transmits the first SI request to the first network-side equipment.

Accordingly, the transmission module 501 is specifically configured to transmit the first SI request to the first network-side equipment at the transmission time.

In some optional embodiments, on the basis of the foregoing embodiments, the reception module 301 receives a scheduling indication message transmitted by the first network-side equipment before receiving the SI transmitted by the first network-side equipment and corresponding to the SI change notification, and the scheduling indication message is configured to indicate SI being broadcast by the first network-side equipment.

Figure 7:
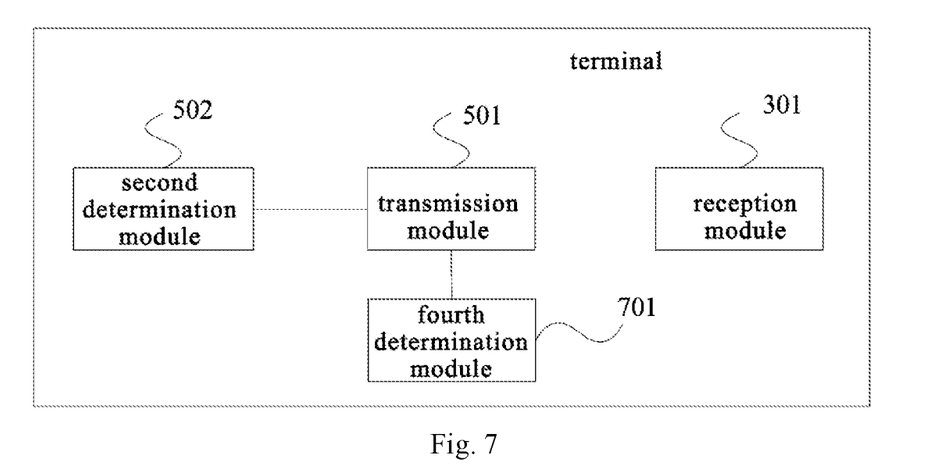
FIG. 7 is still yet another schematic structural diagram of a terminal provided by an embodiment of this disclosure.

FIG. 7 is a schematic structural diagram of a terminal provided by another embodiment of this disclosure. As shown in FIG. 7, on the basis of FIG. 5, the terminal may further include a fourth determination module 701.

The fourth determination module 701 is configured to determine whether the SI being broadcast by the first network-side equipment which is indicated by the scheduling indication message includes SI corresponding to the first SI request before the transmission module 501 transmits the first SI request to the first network-side equipment; and configured to determine to transmit the first SI request when the SI being broadcast by the first network-side equipment which is indicated by the scheduling indication message doesn't include the SI corresponding to the first SI request.

It is noted, the fourth determination module 701 and the second determination module 502 may be provided simultaneously, or only one of them is provided, which is not limited herein.

In some optional embodiments, if the terminal is in an idle or inactive state, the transmission module 501 may be specifically configured to transmit the first SI request to the first network-side equipment during a random access process.

The first SI request is a random access request or a random access configuration request.

In some optional embodiments, the reception module 301 is specifically configured to receive SI broadcast by the first network-side equipment and corresponding to the SI change notification within a preset period, the preset period is a change period subsequent to a current change period and spaced apart from the current change period by the number n of periods, and n is an integer greater than or equal to zero.

In some optional embodiments, the preset period includes one or more consecutive time windows; and the reception module 301 is specifically configured to start receiving the SI broadcast by the first network-side equipment and corresponding to the SI change notification in a start time window of the preset period, and determine, in accordance with broadcast indication information in the SI, whether to continue receiving SI in a next time window following a current time window.

Alternatively, in an implementation, SI corresponding to each of the time windows includes the broadcast indication information, and the broadcast indication information is configured to indicate whether there is SI to be transmitted in the next time window.

In another implementation, SI corresponding to a last time window of the preset period includes the broadcast indication information, and the broadcast indication information is configured to indicate that the current time window is the last time window of the preset period or there is no SI to be transmitted in the next time window.

In some optional embodiments, the reception module 301 is specifically configured to receive scheduling information transmitted by the first network-side equipment, the scheduling information is configured to indicate a resource location of the SI transmitted by the first network-side equipment and corresponding to the SI change notification; and the reception module 301 is configured to receive, in accordance with the resource location indicated by the scheduling information, the SI transmitted by the first network-side equipment and corresponding to the SI change notification.

Figure 8:
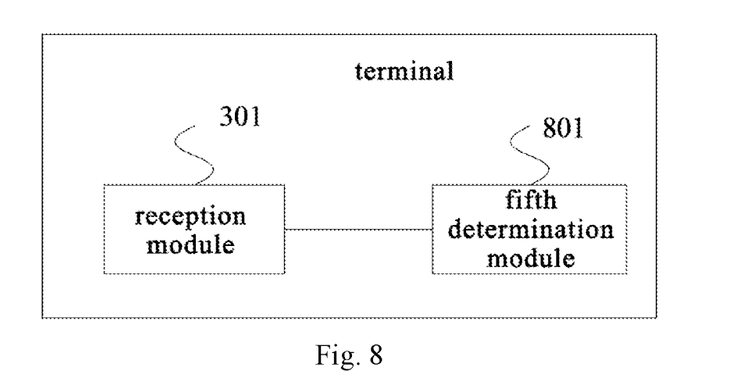
FIG. 8 is still yet another schematic structural diagram of a terminal provided by an embodiment of this disclosure.

FIG. 8 is a schematic structural diagram of a terminal provided by another embodiment of this disclosure. As shown in FIG. 8, on the basis of FIG. 3, the terminal may further include a fifth determination module 801.

In some optional embodiments, if there is a second SI request for SI being transmitted or to be transmitted by the terminal to the first network-side equipment, the fifth determination module 801 is configured to stop transmitting the second SI request, and/or forbid transmitting the second SI request for a preset time duration.

Figure 9:
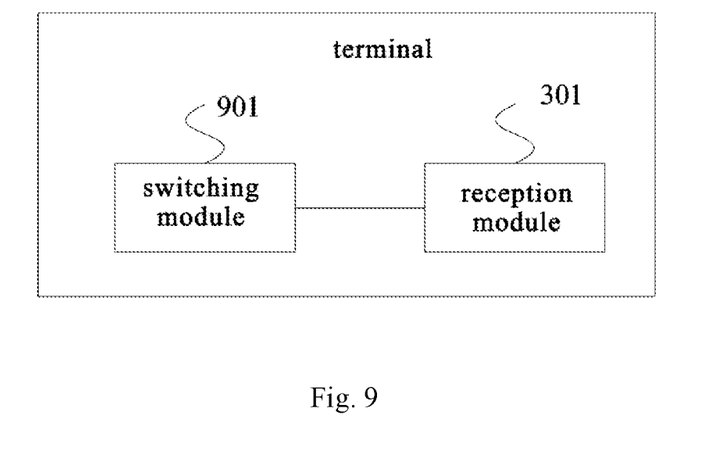
FIG. 9 is still yet another schematic structural diagram of a terminal provided by still an embodiment of this disclosure.

FIG. 9 is a schematic structural diagram of a terminal provided by still another embodiment of this disclosure. On the basis of FIG. 3, the terminal may further include a switching module 901, which is configured to switch the terminal from a connected state to an idle or inactive state before the reception module 301 receives the SI transmitted by the first network-side equipment and corresponding to the SI change notification.

Figure 10:
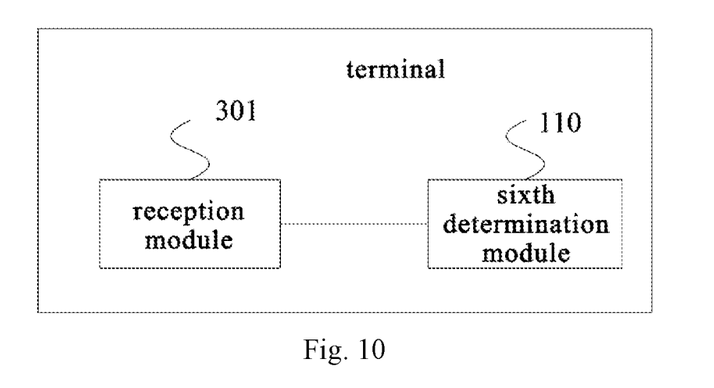
FIG. 10 is still yet another schematic structural diagram of a terminal provided by yet an embodiment of this disclosure.

FIG. 10 is a schematic structural diagram of a terminal provided by yet another embodiment of this disclosure. On the basis of FIG. 3, the terminal may further include a sixth determination module 110.

On the basis of the foregoing embodiments, the reception module 301 is further configured to receive an indication message transmitted by a second network-side equipment, and the indication message is configured to indicate an SI change.

The sixth determination module 110 is configured to determine, in accordance with the indication message, whether to receive changed SI transmitted by the second network-side equipment.

As to details of the change notification and version information in some optional embodiments, refer to the foregoing method embodiments.

The terminal of this embodiment is configured to implement the foregoing method embodiments and has a similar implementation principle and technical effect, a detailed description thereof is not repeated herein.

Figure 11:
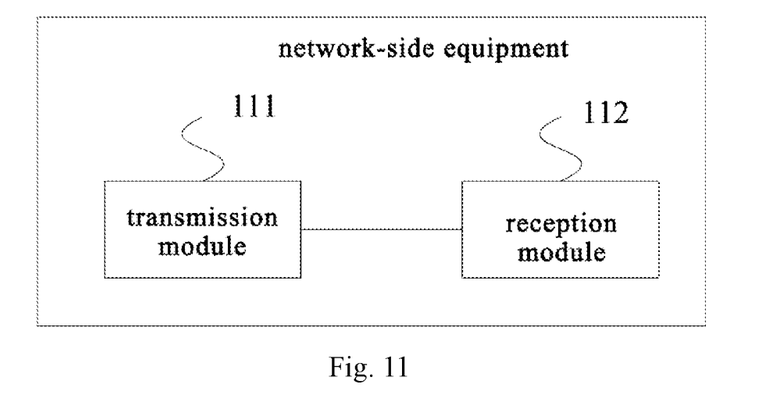
FIG. 11 is a schematic structural diagram of a network-side equipment provided by an embodiment of this disclosure.

FIG. 11 is a schematic structural diagram of a network-side equipment provided by an embodiment of this disclosure. The network-side equipment may be the first network-side equipment of the foregoing embodiments. As shown in FIG. 11, the network-side equipment includes: a transmission module 111, which is configured to transmit an SI change notification to a terminal; and transmit SI corresponding to the SI change notification to the terminal.

In some optional embodiments, the transmission module 111 is further configured to transmit version information of the SI corresponding to the SI change notification to the terminal.

In an optional implementation, the version information of the SI corresponding to the SI change notification is carried in the SI change notification.

Referring to FIG. 11, the network-side equipment further includes: a reception module 112, which is configured to receive a first SI request transmitted by the terminal before the transmission module 111 transmits the SI corresponding to the SI change notification to the terminal.

In some optional embodiments, if the terminal is in an idle or inactive state, the reception module 112 is specifically configured to receive the first SI request transmitted by the terminal during a random access process.

In some optional embodiments, the first SI request is a random access request or a random access configuration request.

In an implementation, the transmission module 111 is further configured to transmit a scheduling indication message to the terminal before transmitting the SI corresponding to the SI change notification to the terminal, and the scheduling indication message is configured to indicate SI being broadcast by the network-side equipment.

In another implementation, the transmission module 111 is further configured to transmit scheduling information to the terminal before transmitting the SI corresponding to the SI change notification to the terminal, and the scheduling information is configured to indicate a resource location of the SI transmitted by the network-side equipment and corresponding to the SI change notification.

In some optional embodiments, the transmission module 111 is specifically configured to transmit the SI corresponding to the SI change notification to the terminal within a preset period.

The preset period may include one or more consecutive time windows.

The transmission module 111 is specifically configured to start transmitting the SI corresponding to the SI change notification to the terminal in a start time window of the preset period.

In a possible implementation, SI corresponding to each of the time windows includes broadcast indication information, and the broadcast indication information is configured to indicate whether there is changed SI to be transmitted in a next time window.

Alternatively, in another possible implementation, SI corresponding to a last time window of the preset period includes the broadcast indication information, and the broadcast indication information is configured to indicate that the current time window is the last time window of the preset period or there is no SI to be transmitted in a next time window.

As to details of the change notification and version information in some optional embodiments, refer to the foregoing method embodiments.

The network-side equipment of this embodiment is configured to implement the foregoing method embodiments and has a similar implementation principle and technical effect, a detailed description thereof is not repeated herein.

Further, on the basis of the foregoing embodiments, in some optional embodiments, the scheduling indication message is included in minimum SI transmitted by the first network-side equipment.

In some optional embodiments, SI is system information on demand of the terminal.

It is understood, the modular division of the network-side equipment and the terminal is merely a logical function division, and in actual implementation the modules may be integrated entirely or partly on one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, the determination module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. Said processing element may be an integrated circuit with signal processing capability. During an implementation process, steps of the methods or the modules may be realized in form of hardware by integrated logical circuits in the processing element, or in form of software by instructions.

For example, these modules may be one or more ICs configured to implement the foregoing methods, e.g., one or more Application Specific Integrated Circuits (ASIC), one or more Digital Signal Processors (DSP), or one or more Field-Programmable Gate Arrays (FPGA), etc. For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

Figure 12:
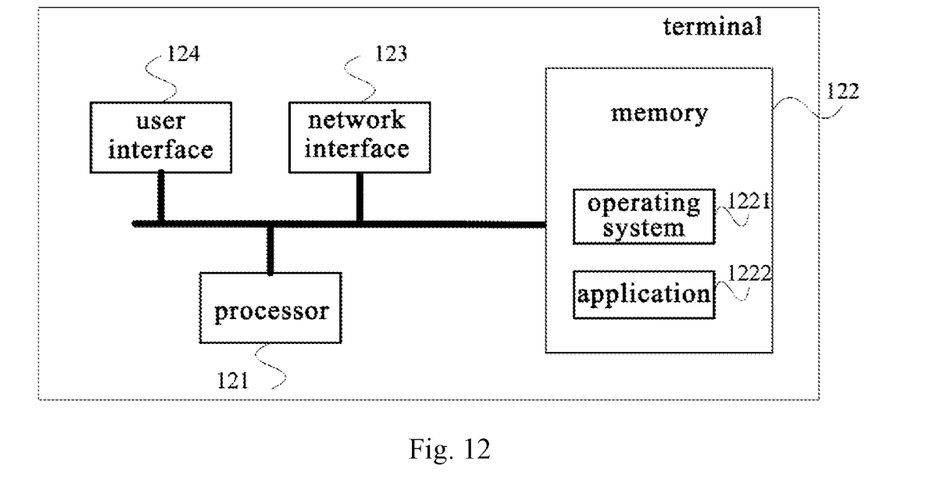
FIG. 12 is another schematic structural diagram of a terminal provided by an embodiment of this disclosure.

FIG. 12 is a schematic structural diagram of a terminal provided by another embodiment of this disclosure. As shown in FIG. 12, the terminal includes: a processor 121, a storage 122, a network interface 123 and a user interface 124.

Various components in the terminal are coupled to each other by a bus system 125. It is understood, the bus system 125 is configured to enable communication connections between these components. In addition to data bus, the bus system 125 includes a power bus, a control bus and a status signal bus. For clarity, various buses are all labeled as the bus system 125 in FIG. 12.

Alternatively, all or part of the components may be embedded in a chip of the terminal in form of FPGAs. The components may be implemented separately or integrated together.

The user interface 124 is configured to be respectively connected to peripherals or interface circuits connected to the peripherals. The user interface 124 may include a display, a keyboard or click device (e.g., a mouse), a trackball, a touchpad, a touch screen, etc.

The processor 121 may be a general purpose processor, e.g., CPU, or one or more ICs configured to implement the above methods, such as one or more Application Specific Integrated Circuits (ASIC), one or more Digital Signal Processors (DSP), or one or more Field-Programmable Gate Arrays (FPGA), etc. A storage element may be one storage device or may refer to multiple storage elements collectively.

The memory 122 may be a volatile or non-volatile memory, or may include both. The non-volatile memory may be a Read-Only Memory (ROM), a Programmable ROM (PROM), an Erasable PROM (EPROM), an Electrically EPROM (EEPROM) or a flash memory. The volatile storage may be a Random Access Memory (RAM), which is used as an external cache. By way of example and without any limitation, many forms of RAMs may be used, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DR-RAM). The memory 122 described in this application is meant to include, without limitation, these and any other suitable types of memories.

In some optional embodiments, the memory 122 stores following elements: executable module or data structure, or a subset or extension set thereof, such as an operating system 1221 and an application 1222.

The operating system 1221 includes various system programs, such as framework layer programs, core library layer programs and driver layer programs, to implement various fundamental services and process hardware-based tasks.

The application 1222 includes various applications, such as Media Player and Browser, to implement a variety of application services. The program implementing the method according to embodiments of this disclosure may be included in the application 1222.

In specific, the processor 121 calls the program in the memory 122 to implement the method performed by the modules as shown in FIG. 3 to FIG. 10, and a repeated description thereof is omitted herein.

Figure 13:
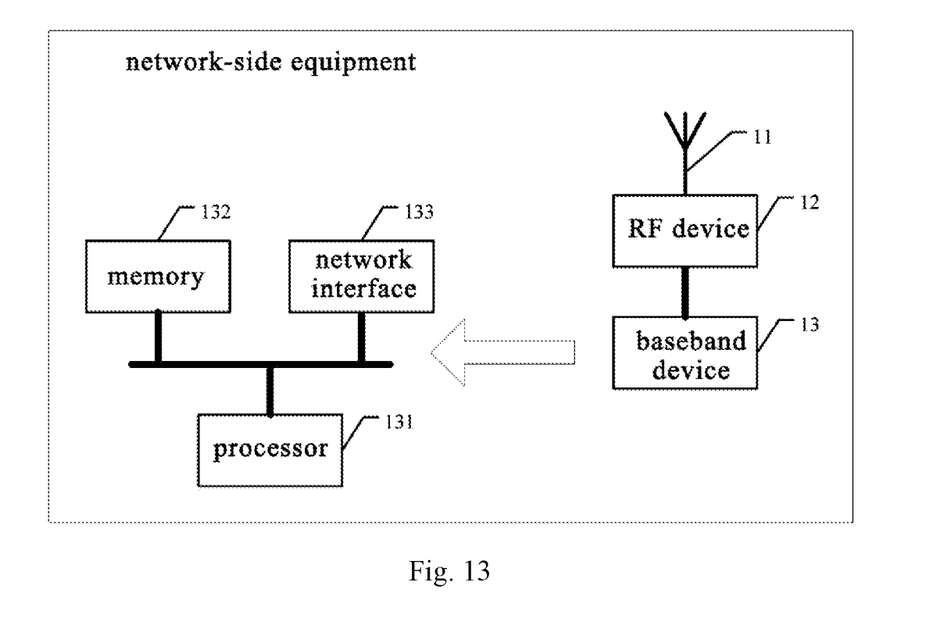
FIG. 13 is yet another schematic structural diagram of a network-side equipment provided by an embodiment of this disclosure.

FIG. 13 is a schematic structural diagram of a network-side equipment provided by another embodiment of this disclosure. The network-side equipment may be the aforementioned first network-side equipment, as shown in FIG. 13, the network-side equipment includes: an antenna 11, a radio frequency (RF) device 12 and a baseband device 13. The antenna 11 is connected to the RF device 12. In an uplink direction, the RF device 12 receives information via the antenna 11 and transmits the received information to the baseband device 13 for processing. In a downlink direction, the baseband device 13 processes the to-be-transmitted information and transmits the information to the RF device 12; the RF device 12 processes the received information and then transmits the processed information via the antenna 11.

The frequency band processing device may be located in the baseband device 13. The method of foregoing embodiment performed by the network-side equipment may be implemented in the baseband device 13. The baseband device 13 may include a processor 131 and a memory 132.

The baseband device 13 may for example include at least one baseband processing board which is provided with multiple chips, as shown in FIG. 13, one of the chips is the processor 131. The processor 131 is connected to the memory 132 to call program in the memory 132, so as to implement the operations of the network-side equipment as described with respect to the method embodiments.

The baseband device 13 may further include a network interface 133 configured to exchange information with the RF device 12. For example, the network interface is a common public radio interface (CPRI).

The processor may refer to one processor or refer to multiple processing elements collectively. For example, the processor may be a CPU, ASIC or one or more ICs configured to implement the method performed by the network-side equipment, such as one or more DSPs or one or more FPGAs. A storage element may be one memory or may refer to multiple storage elements collectively.

The memory 132 may be a volatile or non-volatile memory, or may include both. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of example and without any limitation, many forms of RAMs may be used, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DR-RAM). The memory 132 described in this application is meant to include, without limitation, these and any other suitable types of memories.

In specific, the processor 131 calls the program in the memory 132 to implement the method performed by the modules as shown in FIG. 11, and a repeated description thereof is omitted herein.

Finally, it should be noted, the foregoing embodiments are only used to illustrate the technical solution of this disclosure, and by no means constitute any limitation of this disclosure; although detailed description of this disclosure is provided with reference to the foregoing embodiments, it should be appreciated that modifications to the technical solution set forth in the embodiments or equivalent replacements of a part or all of the technical features may be made by one of ordinary skill in the art, and these modifications or replacements will not make essences of corresponding technical solutions to depart from the scope of the technical solutions of the embodiments of this disclosure.

What is claimed is:

1. A method of transmitting system information (SI), comprising:
    receiving, by a terminal, an SI change notification transmitted by a first network-side equipment; and
    receiving, by the terminal, SI transmitted by the first network-side equipment and corresponding to the SI change notification,
    wherein the SI change notification is carried in a physical downlink control channel (PDCCH) used for scheduling a paging message,
    wherein the receiving, by the terminal, the SI transmitted by the first network-side equipment and corresponding to the SI change notification comprises:
    receiving, by the terminal, SI broadcast by the first network-side equipment and corresponding to the SI change notification within a preset period, wherein the preset period is a change period subsequent to a current change period and spaced apart from the current change period by the number n of periods, and n is an integer greater than or equal to zero.

2. The method according to claim 1, further comprising:
    receiving, by the terminal, the SI that is according to its own demand of the terminal in a preset period, wherein the preset period is a subsequent change period spaced apart from the current change period by the number N of periods, in response to determining the SI that is being broadcast by the first network-side equipment which is indicated by the scheduling indication message does comprise the SI according to its own demand of the terminal, where N is an integer greater than or equal to zero.

3. The method according to claim 1, further comprising:
    transmitting, by the terminal, a first SI request to the first network-side equipment during a random access process if the terminal is in an idle or inactive state;
    wherein the first SI request is a random access request or a random access configuration request.

4. The method according to claim 1, wherein the preset period comprises one or more consecutive time windows; and the receiving, by the terminal, the SI broadcast by the first network-side equipment and corresponding to the SI change notification within the preset period comprises:
    starting receiving, by the terminal, the SI broadcast by the first network-side equipment and corresponding to the SI change notification in a start time window of the preset period; and
    determining, by the terminal, in accordance with broadcast indication information in the SI, whether to continue receiving SI in a next time window following a current time window.

5. The method according to claim 4, wherein SI corresponding to each of the one or more time windows comprises the broadcast indication information, and the broadcast indication information is configured to indicate whether there is SI to be transmitted in the next time window; or
    wherein SI corresponding to a last time window of the preset period comprises the broadcast indication information, and the broadcast indication information is configured to indicate that the current time window is the last time window of the preset period or there is no SI to be transmitted in the next time window.

6. The method according to claim 1, wherein if there is a second SI request for SI being transmitted or to be transmitted by the terminal to the first network-side equipment, then following the receiving, by the terminal, the SI change notification transmitted by the first network-side equipment, the method further comprises:
    stopping transmitting, by the terminal, the second SI request; and/or,
    forbidding transmitting, by the terminal, the second SI request for a preset time duration.

7. The method according to claim 1, wherein prior to the receiving, by the terminal, the SI transmitted by the first network-side equipment and corresponding to the SI change notification, the method further comprises:
    switching the terminal from a connected state to an idle or inactive state.

8. The method according to claim 1, further comprising:
    receiving, by the terminal, an indication message transmitted by a second network-side equipment, wherein the indication message is configured to indicate an SI change; and
    determining, by the terminal in accordance with the indication message, whether to receive SI transmitted by the second network-side equipment.

9. The method according to claim 1, wherein the SI change notification comprises a set of SI change identifiers (ID) which is configured to identify whether there is a change to corresponding SI; and
    the set of SI change IDs comprises any one of: a per-SI block (SIB) change ID, a per-SI change ID, a per-SI group change ID, or a per-functionality change ID, wherein each SI group comprises one or more preset SI and each functionality comprises one or more SI corresponding to a same function.

10. The method according to claim 9, wherein the SI change notification further comprises one or more of: an SI ID, an SI area ID, or version information; and when the set of SI change IDs comprises the per-SIB change ID, the SI ID comprises a per-SIB ID; or
when the set of SI change IDs comprises the per-SI change ID, the SI ID comprises a per-SI ID; or
when the set of SI change IDs comprises the per-SI group change ID, the SI ID comprises a per-SI group ID; or
when the set of SI change IDs comprises the per-functionality change ID, the SI ID comprises a per-functionality ID,
wherein the SI area ID is any one of: a cell ID, a cell group ID, a transmission reception point (TRP) ID or a TRP group ID.

11. A method of transmitting system information (SI), comprising:

transmitting, by a network-side equipment, an SI change notification to a terminal; and
transmitting, by the network-side equipment, SI corresponding to the SI change notification to the terminal,
wherein the SI change notification is carried in a physical downlink control channel (PDCCH) used for scheduling a paging message,
wherein the transmitting, by the network-side equipment, SI corresponding to the SI change notification to the terminal comprises:
transmitting, by the network-side equipment, the SI corresponding to the SI change notification within a preset period, wherein the preset period is a change period subsequent to a current change period and spaced apart from the current change period by the number n of periods, and n is an integer greater than or equal to zero.

12. The method according to claim 11, wherein prior to the transmitting, by the network-side equipment, the SI corresponding to the SI change notification to the terminal, the method further comprises:

transmitting, by the network-side equipment, a scheduling indication message to the terminal, wherein the scheduling indication message is configured to indicate SI that is being broadcast by the network-side equipment.

13. A terminal, comprising: a transceiver, a processor, a memory and a computer program stored on the memory and configured to be executed by the processor, wherein the processor is configured to execute the computer program, to configure the terminal to implement a method of transmitting system information (SI), the method comprising:

receiving, by the terminal, an SI change notification transmitted by a first network-side equipment; and
receiving, by the terminal, SI transmitted by the first network-side equipment and corresponding to the SI change notification,
wherein the SI change notification is carried in a physical downlink control channel (PDCCH) used for scheduling a paging message,
wherein the processor is configured to execute the computer program, to configure the receiving, by the terminal, the SI transmitted by the first network-side equipment and corresponding to the SI change notification to comprise:
receiving, by the terminal, SI broadcast by the first network-side equipment and corresponding to the SI change notification within a preset period, wherein the preset period is a change period subsequent to a current change period and spaced apart from the current change period by the number n of periods, and n is an integer greater than or equal to zero.

14. The terminal according to claim 13, wherein prior to the receiving, by the terminal, the SI transmitted by the first network-side equipment and corresponding to the SI change notification, the method further comprises:

receiving, by the terminal, a scheduling indication message transmitted by the first network-side equipment, wherein the scheduling indication message is configured to indicate SI that is being broadcast by the first network-side equipment;
determining, by the terminal, whether the SI that is being broadcast by the first network-side equipment which is indicated by the scheduling indication message comprises SI that is according to its own demand of the terminal; and
transmitting, by the terminal, a first SI request to the first network-side equipment, in response to determining the SI that is being broadcast by the first network-side equipment which is indicated by the scheduling indication message doesn't comprise the SI that is according to its own demand of the terminal.

15. The terminal according to claim 13, wherein the processor is configured to execute the computer program, to configure the terminal to further execute:

receiving, by the terminal, the SI that is according to its own demand of the terminal in a preset period, wherein the preset period is a subsequent change period spaced apart from the current change period by the number N of periods, in response to determining the SI that is being broadcast by the first network-side equipment which is indicated by the scheduling indication message does comprise the SI according to its own demand of the terminal, where N is an integer greater than or equal to zero.

16. The terminal according to claim 13, wherein the processor is configured to execute the computer program, to further realize:

transmitting, by the terminal, a first SI request to the first network-side equipment during a random access process if the terminal is in an idle or inactive state;
wherein the first SI request is a random access request or a random access configuration request.

17. The terminal according to claim 13, wherein the preset period comprises one or more consecutive time windows; and the processor is configured to execute the computer program, to configure the receiving, by the terminal, the SI broadcast by the first network-side equipment and corresponding to the SI change notification within the preset period to comprise:

starting receiving, by the terminal, the SI broadcast by the first network-side equipment and corresponding to the SI change notification in a start time window of the preset period; and
determining, by the terminal, in accordance with broadcast indication information in the SI, whether to continue receiving SI in a next time window following a current time window.

18. The terminal according to claim 17, wherein SI corresponding to each of the one or more time windows comprises the broadcast indication information, and the broadcast indication information is configured to indicate whether there is SI to be transmitted in the next time window; or wherein SI corresponding to a last time window of the preset period comprises the broadcast indication information, and the broadcast indication information is configured to indicate that the current time window is the last time window of the preset period or there is no SI to be transmitted in the next time window.

* * * * *